(12) United States Patent
Kim et al.

(10) Patent No.: US 9,254,840 B2
(45) Date of Patent: Feb. 9, 2016

(54) APPARATUS, SYSTEM AND METHOD FOR CONTROLLING ENGINE STARTING WHILE SHIFTING OF HYBRID ELECTRIC VEHICLE

(71) Applicant: Hyundai Motor Company, Seoul (KR)

(72) Inventors: Sang Joon Kim, Seoul (KR); Dong Ho Yang, Geyongsangnam-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/517,284

(22) Filed: Oct. 17, 2014

(65) Prior Publication Data

US 2015/0183424 A1 Jul. 2, 2015

(30) Foreign Application Priority Data

Dec. 26, 2013 (KR) .......................... 10-2013-0163784

(51) Int. Cl.

| | | |
|---|---|---|
| *B60W 10/04* | (2006.01) | |
| *B60W 10/10* | (2012.01) | |
| *B60W 20/00* | (2006.01) | |
| *B60W 10/06* | (2006.01) | |
| *B60W 10/08* | (2006.01) | |
| *B60W 10/02* | (2006.01) | |
| *B60K 6/48* | (2007.10) | |
| *B60W 10/11* | (2012.01) | |

(52) U.S. Cl.
CPC ................... *B60W 20/40* (2013.01); *B60K 6/48* (2013.01); *B60W 10/02* (2013.01); *B60W 10/06* (2013.01); *B60W 10/08* (2013.01); *B60W 10/10* (2013.01); *B60W 10/11* (2013.01); *Y10S 903/93* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,077,186 | A * | 6/2000 | Kojima et al. ................ | 477/3 |
| 6,430,483 | B2 * | 8/2002 | Takaoka et al. ................ | 701/22 |
| 2002/0179348 | A1 * | 12/2002 | Tamai et al. ................ | 180/65.2 |
| 2008/0132379 | A1 * | 6/2008 | Matsubara et al. ............ | 477/3 |
| 2009/0227409 | A1 * | 9/2009 | Ito et al. ................ | 475/5 |
| 2013/0284125 | A1 * | 10/2013 | Zollner et al. ................ | 123/2 |

FOREIGN PATENT DOCUMENTS

| | | |
|---|---|---|
| JP | 4466514 B2 | 5/2010 |
| KR | 10-2007-0070305 | 7/2007 |
| KR | 10-0862468 | 10/2008 |

* cited by examiner

*Primary Examiner* — Thomas Tarcza
*Assistant Examiner* — Edward Pipala
(74) *Attorney, Agent, or Firm* — Mintz Levin Cohn Ferris Glovsky and Popeo, P.C.; Peter F. Corless

(57) ABSTRACT

A technique for controlling engine starting while shifting a hybrid vehicle is provided that minimizes fuel consumption of the engine by determining an improved engine starting time and drivability when a current operating state of the hybrid vehicle requests a kick down shift required to start the engine and coupling of the engine clutch. In particular, the technique controls engine starting while shifting a hybrid vehicle by employing an information detector configured to detect a current operating state of the hybrid electric vehicle, and a controller configured to control an operation of a transmission, a motor, an engine, and an engine clutch based on output signals from the operating information detector.

19 Claims, 4 Drawing Sheets

APPARATUS, SYSTEM AND METHOD FOR CONTROLLING ENGINE STARTING WHILE SHIFTING OF HYBRID ELECTRIC VEHICLE

CROSS-REFERENCE TO RELATED APPLICATION

This application claims priority to and the benefit of Korean Patent Application No. 10-2013-0163784 filed in the Korean Intellectual Property Office on Dec. 26, 2013, the entire contents of which are incorporated herein by reference.

BACKGROUND OF THE INVENTION (a) Field of the Invention

The present invention relates to an apparatus, a system and a method for controlling engine starting while shifting of a hybrid electric vehicle. More particularly, the present invention relates to an apparatus, a system and a method for controlling engine starting while shifting of the hybrid electric vehicle that minimizes a fuel consumption amount of the engine by determining an engine starting time when a current operating state of the hybrid electric vehicle requests a kick down shift required to start the engine and coupling of the engine clutch.

(b) Description of the Related Art

Generally, a hybrid electric vehicle is driven by a combination of an engine which generates torque from fuel combustion and an electric motor which generates torque from an electric battery. Hybrid electric vehicles are typically provided with optimum output torque, depending on how the engine and the motor are operated while the vehicles are driven by the two power sources (i.e., engine and the motor).

In hybrid electric vehicles, a transmission mounted electric device (TMED) type of power train in which an engine clutch is disposed between the engine and the motor is generally used. Thus, the hybrid electric vehicle is driven in an EV mode or an HEV mode in accordance with connection of the engine clutch.

In the TMED type of the hybrid electric vehicle, when a demand torque of a driver is increased suddenly (e.g., a kick down shift is requested) in order to accelerate in the EV mode, the hybrid electric vehicle performs a kick down shift control that shifts the vehicle into a lower gear.

While kick down shift controlling, it is desirable that the engine clutch of the hybrid electric vehicle be coupled while simultaneously shifting. The engine clutch, to however, is coupled before shifting or after shifting because of control complexity. Do to this; drivers are often not satisfied with the acceleration output from hybrid electric vehicles.

The control for coupling the engine clutch of the TMED type of the hybrid electric vehicle in a real shifting region is essential for proper acceleration. Therefore, determination of the engine starting time for coupling the engine clutch is important to providing a responsive hybrid electric vehicle.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and a method for controlling engine starting while shifting a hybrid electric vehicle having advantages of minimizing a fuel consumption amount of the engine by determining an engine starting time and improving drivability when a current operating state of the hybrid electric vehicle requests that a kick down shift is required to start the engine and coupling of the engine clutch.

An exemplary embodiment of the present invention provides an apparatus for controlling engine starting while shifting a hybrid electric vehicle which includes a motor connected to an automatic transmission and an engine connected to the motor through an engine clutch that may include an operating information detector configured to detect a current operating state of the hybrid electric vehicle and a controller configured to control an operation of the automatic transmission, the motor, the engine, and the engine clutch by receiving an output signal from the operating information detector.

The controller may calculate a real shifting preparation time and an increase amount of a motor speed during the real shifting preparation time when the current operating state requests that a kick down shift is required to start the engine, and may determine a target engine speed and an engine starting time by calculating an arrival time to reach the target engine speed.

Additionally, in some exemplary embodiments, an operating information detector may include an accelerator pedal sensor, a motor speed sensor, an engine speed sensor, and a vehicle speed sensor. The controller may calculate a load and a motor output torque according to a vehicle speed by receiving a signal from the vehicle speed sensor. The controller may also calculate the arrival time to reach the target engine speed by considering an engine friction torque, a maximum output torque of a hybrid starter and generator (HSG), and an engine output torque.

The controller may calculate the engine friction torque by receiving a coolant temperature and an engine speed from the operating information detector, and may calculate the maximum output torque of the hybrid starter and generator (HSG) by receiving a speed of the HSG and available power of a battery. As such, the controller may calculate the engine output torque generated when a fuel is injected into the engine in order to reach the target engine speed.

Another exemplary embodiment of the present invention provides a method for controlling engine starting while shifting a hybrid electric vehicle which includes a motor connected to an automatic transmission and an engine connected to the motor through an engine clutch that may include: determining whether a current operating state of the hybrid electric vehicle requests a kick down shift required to start the engine; calculating a real shifting preparation time when the current operating state of the hybrid electric vehicle requests the kick down shift required to start the engine; calculating an increase amount of a motor speed during the real shifting preparation time; determining a target engine speed for coupling the engine clutch; calculating an arrival time to reach the target engine speed; and determining an engine starting time according to the arrival time.

The calculation of the increase amount of the motor speed during the real shifting preparation time may include: calculating a load according to a vehicle speed; calculating a motor output torque according to the vehicle speed; and calculating the increase amount of a motor speed based on the load and the motor output torque according to the vehicle speed. The arrival time may be calculated by considering an engine friction torque, a maximum output torque of a hybrid starter and generator (HSG), and an engine output torque.

The engine friction torque may be calculated on the basis of a coolant temperature and an engine speed. The maximum output torque of the hybrid starter and generator (HSG) may be calculated on the basis of a speed of the HSG and available power of a battery. The engine output torque may be generated when a fuel is injected into the engine in order to reach the target engine speed.

As described above, according to the exemplary embodiment of the present invention, fuel consumption of the engine is minimized by determining an engine starting time, so fuel efficiency and drivability of the hybrid electric vehicle can be improved.

DETAILED DESCRIPTION OF THE EMBODIMENTS

Figure 1:
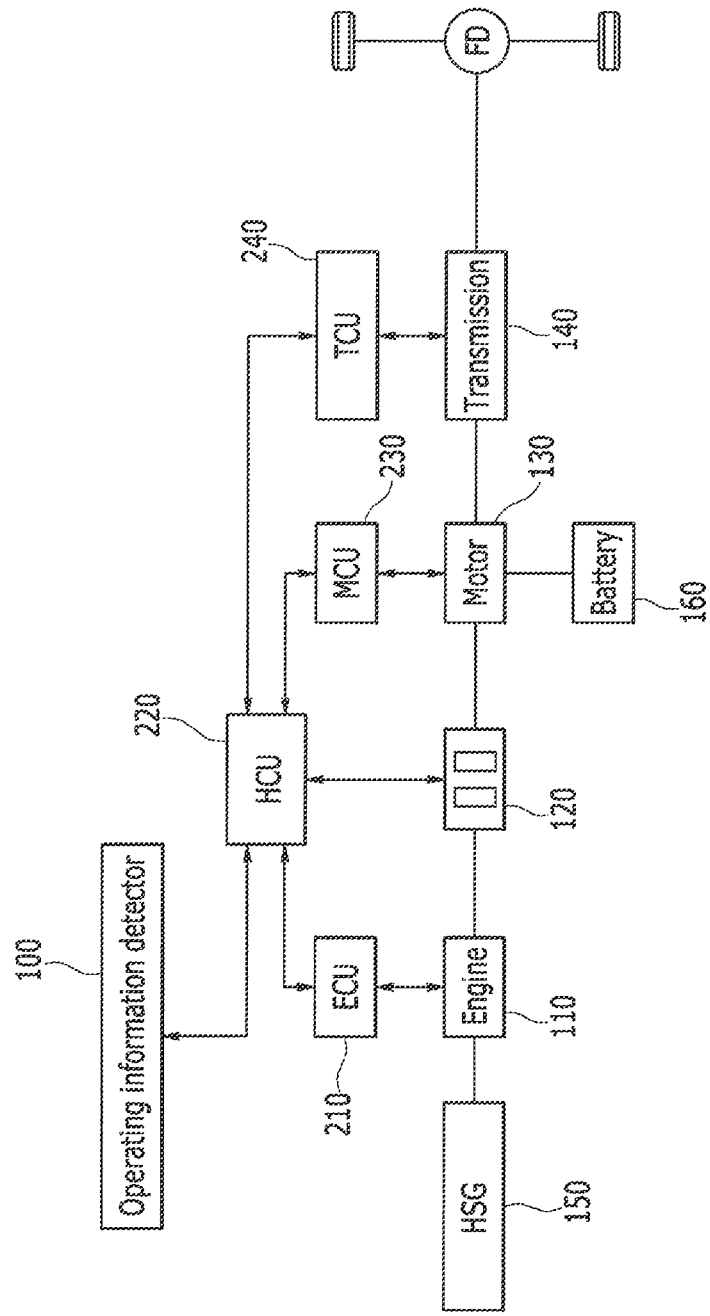
FIG. 1 is a schematic diagram of a hybrid system to which a method for controlling engine starting while shifting of a hybrid electric vehicle is applied according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes to hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The configurations are optionally shown in the drawings for convenience of description, and the present invention is not limited to the drawings.

Like reference numerals designate like elements throughout the specification.

Throughout this specification and the claims which follow, unless explicitly to described to the contrary, the word "comprise" and variations such as "comprises" or "comprising" will be understood to imply the inclusion of stated elements but not the exclusion of any other elements.

An exemplary embodiment of the present invention will hereinafter be described in detail with reference to the accompanying drawings.

FIG. 1 is a schematic diagram of a hybrid system to which a system, apparatus and method for controlling engine starting while shifting of a hybrid electric vehicle is applied according to an exemplary embodiment of the present invention. The hybrid system as shown in FIG. 1 is an exemplary embodiment of the present invention for better comprehension and ease of description. Therefore, a techniques for controlling engine starting while shifting of a hybrid electric vehicle according to an exemplary embodiment of the present invention may not only be applied to the hybrid system as shown in FIG. 1, but may also be applied to all other types of hybrid systems.

As shown in FIG. 1, an apparatus for controlling engine starting while shifting of a hybrid electric vehicle according to an exemplary embodiment of the present invention includes an engine 110, an engine clutch 120, a motor 130, a transmission 140, a hybrid starter and generator (HSG) 150, a battery 160, an engine control unit (ECU) 210, a hybrid control unit (HCU) 220, a motor control unit (MCU) 230, and a transmission control unit (TCU) 240.

Operationally, the engine 110 outputs power as a power source while turning on. The engine clutch 120 is disposed between the engine 110 and the motor 130 to receive a control signal of the HCU 220 and selectively connect the engine 110 and the motor 130 according to a driving mode of the hybrid electric vehicle.

The motor 130 may be operated by, for example, a 3-phase AC voltage applied to from the battery 160 through an inverter (not shown) to generate torque. Conversely in some modes (i.e., Battery Charge Mode, Cruise Mode, etc.), the motor may also be operated as a power generator that supplies regenerative energy to the battery 160.

The transmission 140 supplies a sum of an output torque of the engine 110 and an output torque of the motor 130 determined by coupling and releasing of the engine clutch 120 as an input torque, and shifts the vehicle between gears during operation according to a vehicle speed and driving conditions to output driving force to the wheels/tires to drive the vehicle.

The HSG 150 operates as a starter and/or a generator, starts the engine 110 in response to a control signal from the HCU 220, and generates power by operating as a generator and supplies the generated power as a charge voltage to the battery 160 when the engine 110 is running.

The battery 160 is composed of a plurality of unit cells, and stores a high voltage for supplying a voltage to the motor 130, for example, 400 V or 450 V DC.

The ECU 210 controls an entire operation of the engine 110 according to conditions of the engine 110 such as a demand torque from a driver, a coolant temperature, and an engine torque. Furthermore, the HCU 220 controls operation of other controllers which mutually exchange information in an entire operation of a hybrid electric vehicle (e.g., through a controller area network (CAN)), so that the HCU 220 may accurately control the output torque from the engine 110 and the motor 130 by cooperating with the other controllers.

Somewhat like the ECU, the MCU 230 controls an entire operation of the motor 130 according to a demand torque from a driver, a driving mode of the hybrid electric vehicle, and an SOC condition of the battery 160. Also, the TCU 240 controls an entire operation of the transmission 140 such as speed ratios of the transmission 140 depending on output torque of the engine 110 and the motor 130, and an amount of regenerative braking.

It should be noted, however, that the hybrid system as described above is well known to a person of ordinary skill in the art, so a detailed explanation thereof will be omitted since the present invention can be applied to any known hybrid system.

Figure 2:
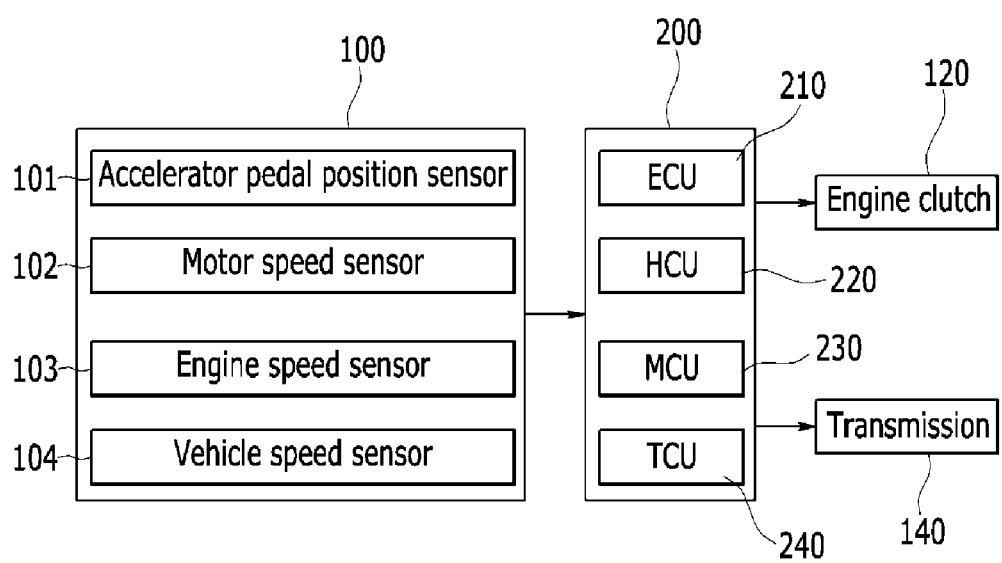
FIG. 2 is a block diagram of an apparatus for controlling engine starting while shifting of a hybrid electric vehicle according to an exemplary embodiment of the present invention.

As such, FIG. 2 is a block diagram of an apparatus for controlling engine starting while shifting a hybrid electric vehicle according to an exemplary embodiment of the present invention. As shown in FIG. 2, an apparatus for controlling engine starting while shifting the hybrid electric vehicle according to an exemplary embodiment of the present invention includes an operating information detector 100, a controller 200, the engine clutch 120, and the transmission 140.

The controller 200 may be configured to control engine starting while shifting of the hybrid electric vehicle according to an exemplary embodiment of the present invention to be described below through cooperative control between many controllers provided in the hybrid vehicle. Accordingly, for convenience of description, in this specification and claims, many controllers provided in the hybrid vehicle such as the ECU 210, the HCU 220, the MCU 230, and the TCU 240 are commonly called as a unit the controller 200.

In the exemplary embodiment of the present invention, the operating information detector 100 may include an accelerator pedal position sensor 101, a motor speed sensor 102, an engine speed sensor 103, and a vehicle speed sensor 104. Signals from these above described sensors may be output to the controller 200 through a network (e.g., CAN) in order to more accurately control the engine starting and clutch engagement during hybrid operation.

In particular, the accelerator pedal position sensor 101 continuously monitors/detects a position value of an accelerator pedal and transmits a monitoring signal to the controller 200. The position value of the accelerator pedal may be 100% when the accelerator pedal is fully depressed. Conversely, the position value of the accelerator pedal may be 0% when the accelerator pedal is not depressed at all.

If the position value of the accelerator pedal is greater than 0%, the controller 200 determines that the driver intends to accelerate. Thus, the controller 200 recognizes a minimum demand torque of the driver as 0 Nm, and calculates a demand torque being requested by the driver. On the other hand, if the position value of the accelerator pedal is 0%, the controller 200 determines that a minimum demand torque of the driver is a creep torque which is a minimum torque according to creep driving of the vehicle.

Furthermore, the motor speed sensor 102 may be configured to detect a rotational speed of the motor 130 and transmit a corresponding signal to the controller 200. Likewise, the engine speed sensor 103 may be configured to detect a rotational speed of the engine 110 and transmit a corresponding signal to the controller 200. The vehicle speed sensor 104, on the other hand, may be configured to detect a speed of the hybrid electric vehicle itself, and may be mounted to, for example, a wheel of the hybrid electric vehicle.

As such, the controller 200 controls an operation of the engine clutch 120 and the transmission 140 by receiving corresponding signals from the accelerator pedal position sensor 101, the motor speed sensor 102, the engine speed sensor 103, and the vehicle speed sensor 104. The controller 200 may calculate a real shifting preparation time and how much a motor speed must increase during the real shifting preparation time when a current operating state of the hybrid electric vehicle based on an output signal of the operating information detector 100 requests a kick down shift required to start the engine. The real shifting preparation time means a region where a pressure of operating elements of the transmission is changed for generating slip before actual shifting. Moreover, the controller 200 may determine a target engine speed and an engine starting time by calculating an arrival time (i.e., how long the engine has) to reach the target engine speed.

Figure 3:
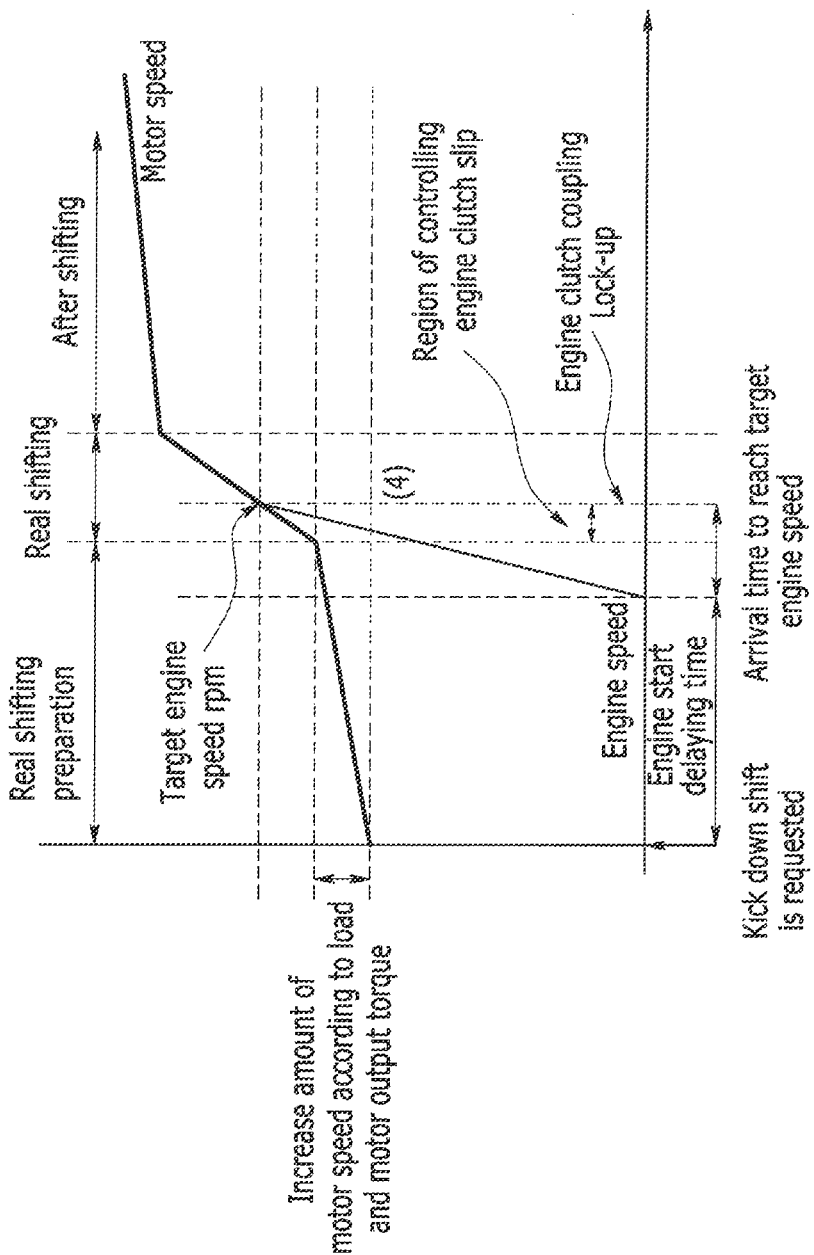
FIG. 3 is a graph showing a relationship between an engine speed and a motor speed of the hybrid electric vehicle for determining an engine starting time while shifting according to an exemplary embodiment of the present invention.

FIG. 3 is a graph showing a relationship between an engine speed and a motor speed of the hybrid electric vehicle for determining an engine starting time while shifting according to an exemplary embodiment of the present invention. Referring to FIG. 3, when a kick down shift of the hybrid electric vehicle is requested, an engine start delaying time and an arrival time to reach a target engine speed are required to reach a real shifting region where a clutch of the transmission 140 slips into the lower gear. If, however, the engine clutch 120 is coupled during the real shifting region, deterioration of drivability due to disturbance of the engine clutch 120 will be reduced.

A real shifting preparation time is required to operate a clutch or a brake of the transmission 140 for shifting before actual shifting. A speed increase amount of the motor 130 may be determined during the real shifting preparation time according to a motor output torque and a load of the vehicle. Therefore, the controller 200 calculates the load and the motor output torque according to a vehicle speed received in a signal from the vehicle speed sensor 104. The motor output torque may be a driving torque of the hybrid electric vehicle in the EV mode.

In addition, the controller 200 may calculate the arrival time to reach the target engine speed by considering, for example, an engine friction torque, a maximum output torque of the HSG 150, and an engine output torque. In doing so, the controller 200 may calculate the engine friction torque based on a received coolant temperature and engine speed from the operating information detector 100, and may calculate the maximum output torque of the HSG 150 based on a speed of the HSG 150 known by the HCU and available power of the battery 160.

Moreover, the controller 200 may calculate the engine output torque generated when fuel is injected into the engine in order to reach the target engine speed. The engine 110 may affect the load of the vehicle before the fuel is injected into the engine 110, however, the engine 110 may be used for increasing the engine speed by outputting torque after fuel is injected into the engine 110.

Consequently, the controller 200 may determine the engine starting time by adding the real shifting preparation time to the arrival time to reach the target engine speed and subtracting the engine start delaying time.

To this end as mentioned above, the controller 200 may be implemented as at least one processor that is operated by a predetermined program, and the predetermined program may be programmed in order to perform each step of a method for controlling engine starting while shifting of the hybrid electric vehicle according to an exemplary embodiment of the present invention.

Figure 4:
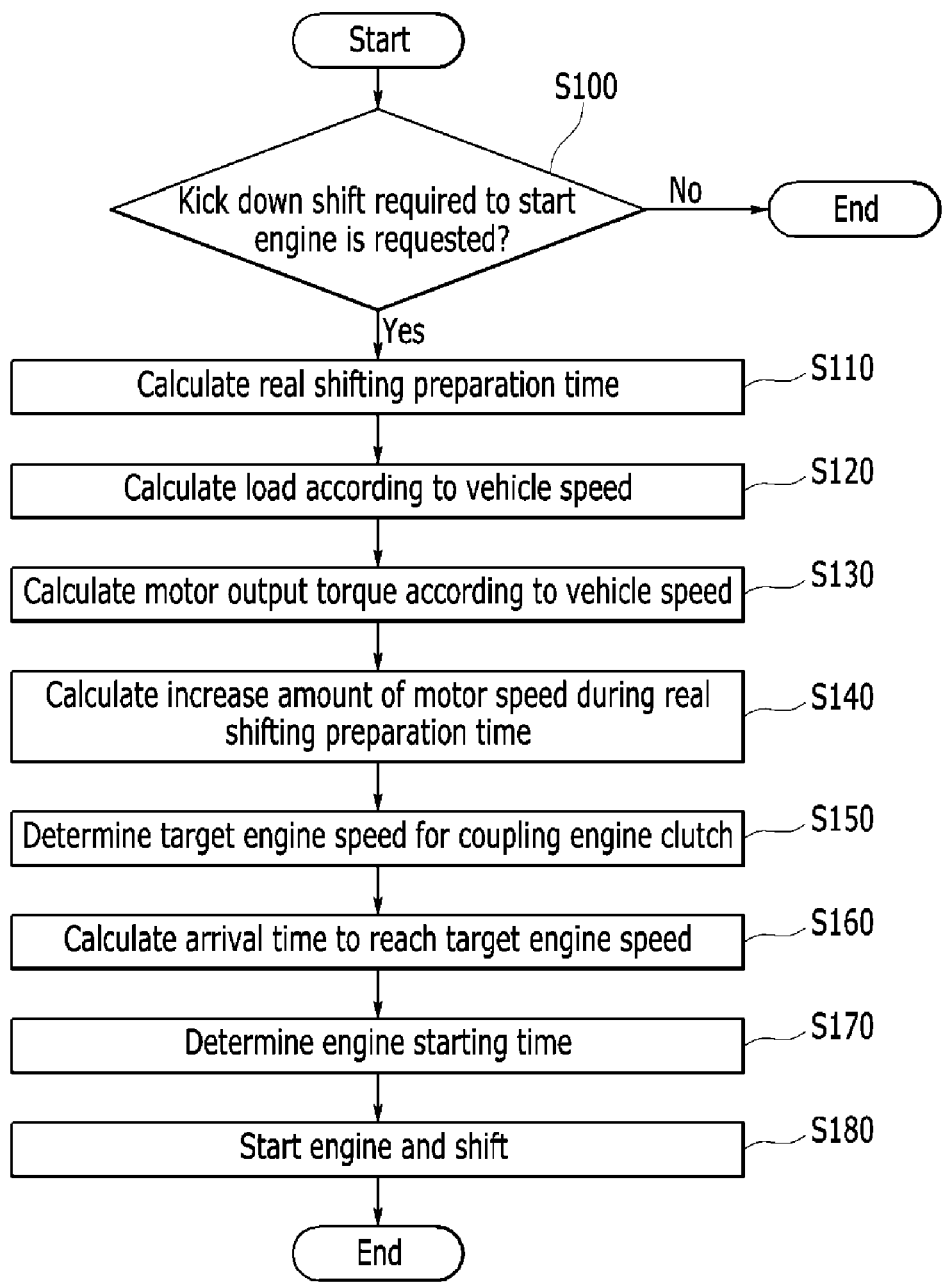
FIG. 4 is a flowchart showing a method for controlling engine starting while shifting of the hybrid electric vehicle according to an exemplary embodiment of the present invention.

Hereinafter, referring to FIG. 4, a method for controlling engine starting while shifting the hybrid electric vehicle according to an exemplary embodiment of the present invention will be described in detail. FIG. 4 is a flowchart showing a method for controlling engine starting while shifting the hybrid electric vehicle according to an exemplary embodiment of the present invention.

As shown in FIG. 4, a method for controlling engine starting while shifting the hybrid electric vehicle according to an exemplary embodiment of the present invention starts when the controller 200 determines whether a current operating state of the hybrid electric vehicle requests a kick down shift required to start the engine at step S100.

That is, the controller 200 determines whether a current driving mode of the hybrid electric vehicle is in an EV mode and a kick down shift condition according to the current operating state of the hybrid electric vehicle is satisfied. The kick down shift condition may be determined by a predetermined map and a signal output from the operating information detector 100.

If the current operating state of the hybrid electric vehicle requests the kick down shift required to start the engine at the step S100, the controller 200 in the exemplary embodiment of the present invention calculates a real shifting preparation time at step S110. Then, the controller 200 calculates a load according to a vehicle speed at step S120, and calculates a motor output torque according to the vehicle speed at step S130.

After that, the controller 200 calculates the increase amount of a motor speed (i.e., the required increase motor speed) during the real shifting preparation time based on the load and the motor output torque according to the vehicle speed at step S140. The increase amount of the motor speed may be calculated by axis-converting an increase amount of the vehicle speed. Next, the controller 200 determines a target engine speed for coupling the engine clutch 120 at step S150. The target engine speed may be determined by considering fuel consumption amount and disturbance of the engine clutch 120. If the target engine speed is determined at the step S150, the controller 200 calculates an arrival time (i.e., how long the system has) to reach the target engine speed at step S160. As stated above, the arrival time may be calculated by considering an engine friction torque, a maximum output torque of an HSG 150, and an engine output torque.

The controller 200 then determines the engine starting time by adding the real shifting preparation time to the arrival time to reach the target engine speed and subtracting the engine start delaying time at step S170. If the engine starting time is determined at the step S170, the controller 200 performs starting of the engine 110 and shifting by controlling the engine clutch 120 and the transmission 140 at step S180 according to the calculated engine starting time.

According to an exemplary embodiment of the present invention, the apparatus and the method for controlling engine starting while shifting the hybrid electric vehicle minimizes the fuel consumption amount of the engine by determining the engine starting time if the current operating state of the hybrid electric vehicle requests a kick down shift required to start the engine and the coupling of the engine clutch, so the fuel efficiency and drivability of the hybrid electric vehicle can be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An apparatus for controlling engine starting while shifting a hybrid vehicle, the apparatus comprising:
   an operating information detector configured to detect a current operating state of components of the hybrid electric vehicle; and
   a controller configured to control an operation of a transmission, a motor, an engine, and an engine clutch within the hybrid vehicle based on an output signal from the operating information detector,
   wherein the controller is configured to calculate a real shifting preparation time and an increase amount of a motor speed during the real shifting preparation time when the current operating state requests a kick down shift required to start the engine, and determines a target engine speed and an engine starting time by calculating an arrival time to reach the target engine speed and in response, controls engine starting based on the engine starting time.

2. The apparatus of claim 1, wherein the operating information detector includes an accelerator pedal position sensor, a motor speed sensor, an engine speed sensor, and a vehicle speed sensor.

3. The apparatus of claim 1, wherein the controller is further configured to calculate a load and a motor output torque according to a vehicle speed based on a signal from the vehicle speed sensor.

4. The apparatus of claim 1, wherein the controller is further configured to calculate the arrival time to reach the target engine speed by considering an engine friction torque, a maximum output torque of a hybrid starter and generator (HSG), and an engine output torque.

5. The apparatus of claim 4, wherein the controller is further configured to calculate the engine friction torque by receiving a coolant temperature and an engine speed from the operating information detector.

6. The apparatus of claim 4, wherein the controller is further configured to calculate the maximum output torque of the hybrid starter and generator (HSG) by receiving a speed of the HSG and available power of a battery.

7. The apparatus of claim 4, wherein the controller is further configured to calculate the engine output torque generated when a fuel is injected into the engine in order to reach the target engine speed.

8. A method for controlling engine starting while shifting a hybrid vehicle, the method comprising:
   determining, by a controller, whether a current operating state of the hybrid vehicle requests a kick down shift required to start an engine;
   calculating, by a controller, a real shifting preparation time when the current operating state of the hybrid vehicle requests the kick down shift required to start the engine;
   calculating, by the controller, an increase amount of a motor speed during the real shifting preparation time;
   determining, by the controller, a target engine speed for coupling an engine clutch;
   calculating, by a controller, an arrival time to reach the target engine speed;
   determining, by a controller, an engine starting time according to the arrival time; and
   starting and shifting the engine at the determined engine starting time.

9. The method of claim 8, wherein the calculation of the increase amount of the motor speed during the real shifting preparation time includes:
 calculating a load according to a vehicle speed;
 calculating a motor output torque according to the vehicle speed; and
 calculating the increase amount of a motor speed based on the load and the motor output torque according to the vehicle speed.

10. The method of claim 8, wherein the arrival time is calculated by considering an engine friction torque, a maximum output torque of a hybrid starter and generator (HSG) and an engine output torque.

11. The method of claim 10, wherein the engine friction torque is calculated according to a coolant temperature and an engine speed.

12. The method of claim 10, wherein the maximum output torque of the hybrid starter and generator (HSG) is calculated based on a speed of the HSG and available power of a battery.

13. The method of claim 10, wherein the engine output torque is generated when a fuel is injected into the engine in order to reach the target engine speed.

14. A non-transitory computer readable medium containing program instructions executed by a processor or controller, the computer readable medium comprising:
 program instructions that determine whether a current operating state of the hybrid vehicle requests a kick down shift required to start an engine;
 program instructions that calculate a real shifting preparation time when the current operating state of the hybrid vehicle requests the kick down shift required to start the engine;
 program instructions that calculate an increase amount of a motor speed during the real shifting preparation time;
 program instructions that determine a target engine speed for coupling an engine clutch;
 program instructions that calculate an arrival time to reach the target engine speed;
 program instructions that determine an engine starting time according to the arrival time; and
 program instructions that start and shift the engine at the determined engine starting time.

15. The non-transitory computer readable medium of claim 14, wherein the program instructions that calculate the increase amount of the motor speed during the real shifting preparation time include:
 program instructions that calculate a load according to a vehicle speed;
 program instructions that calculate a motor output torque according to the vehicle speed; and
 program instructions that calculate the increase amount of a motor speed based on the load and the motor output torque according to the vehicle speed.

16. The non-transitory computer readable medium of claim 15, wherein the arrival time is calculated by considering an engine friction torque, a maximum output torque of a hybrid starter and generator (HSG) and an engine output torque.

17. The non-transitory computer readable medium of claim 16, wherein the engine friction torque is calculated according to a coolant temperature and an engine speed.

18. The non-transitory computer readable medium of claim 16, wherein the maximum output torque of the hybrid starter and generator (HSG) is calculated based on a speed of the HSG and available power of a battery.

19. The non-transitory computer readable medium of claim 16, wherein the engine output torque is generated when a fuel is injected into the engine in order to reach the target engine speed.

* * * * *